June 2, 1931.  O. L. NEISLER  1,808,473
SPRING
Filed Dec. 27, 1924
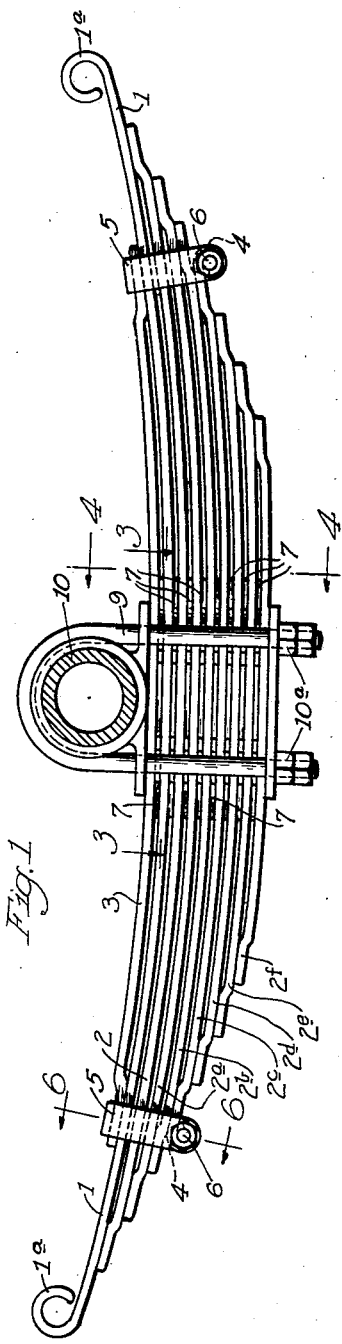
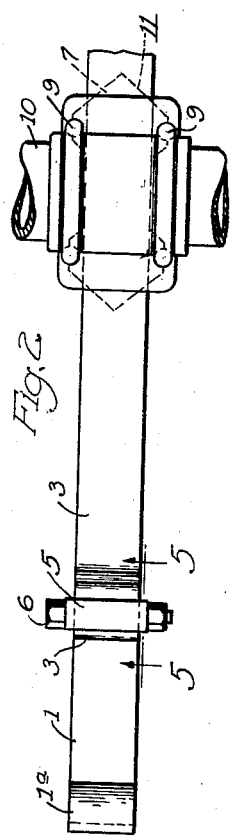
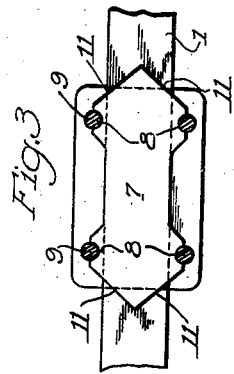
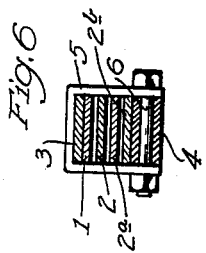
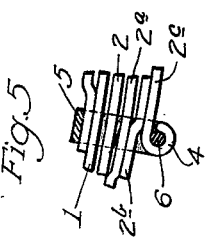
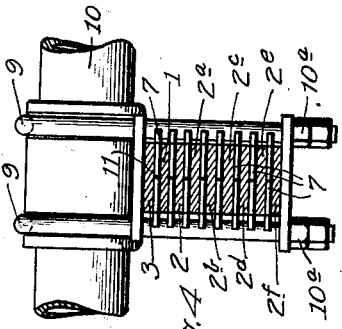
INVENTOR
Oscar L. Neisler.
By Parker & Carter
Attys.

Patented June 2, 1931

1,808,473

UNITED STATES PATENT OFFICE

OSCAR LINUS NEISLER, OF CHICAGO, ILLINOIS

SPRING

Application filed December 27, 1924. Serial No. 758,370.

This invention relates to springs for vehicles and has for its object to provide a new and improved device of this description. The invention has as a further object to provide a spring of greater strength and greater elasticity than those now in use. The invention has as a further object to provide a spring which it is not necessary to oil and one in which dirt will not accumulate between the leaves. The invention has further objects which are more particularly pointed out in the accompanying description.

Referring now to the drawings:

Fig. 1 is a view showing one form of spring embodying the invention.

Fig. 2 is a plan view, with parts omitted, of the spring illustrated in Fig. 1.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 2.

Fig. 6 is a sectional view taken on line 6—6 of Fig. 1.

Like numerals refer to like parts throughout the several figures.

Referring now to the drawings, I have shown a spring made up of a series of leaves. As illustrated in Fig. 1 there is a connecting or master leaf 1 by means of which the spring is connected to one portion of the vehicle. Associated with the connecting leaf are a series of spring leaves 2, 2a, 2b, 2c, 2d, 2e and 2f, gradually decreasing in length. These spring leaves have their ends bent with relation to the main body thereof so that the bent ends of each engage the adjacent leaf thereby leaving a space between each of the leaves as is clearly illustrated in Fig. 1. The relative length of the spring leaves will depend upon the conditions presented, but I prefer to have the bent ends of the leaves engage the adjacent leaves just inside of the bent portions of the adjacent leaf. In other words the length of the spring leaves is preferably such that each adjacent leaf is shorter than the leaf with which it is associated by the length of the bent ends of such leaf, as clearly shown in Fig. 1, the ends of any given leaf extending to the inner ends of the bent portions of the adjacent leaf next above it. A top spring leaf 3 engages the connecting leaf 1 and also preferably has bent ends so as to be separate from the connecting leaf by a space. This leaf 3 acts as a pressure bar at the top of the spring. The spring leaf 2c as herein shown is provided at its ends with loops 4 and the holding shackles or bands 5 pass around the ends of the leaf 3 and the leaf 2c, and the intermediate leaves and are held in place by bolts 6 which pass through the loops 4 as shown in Fig. 5. Located between the various leaves are the spacer plates 7. These spacer plates are located at the middle of the spring and are provided with notches 8 into which fit the fasteners 9 by means of which the spring is connected to the axle 10. The spring leaves are of hard steel and the spacer plates of softer material and when the nuts 10a are tightened the several leaves are tightly clamped together and the notches 8 in the spacer plates prevent longitudinal movement of the parts in relation to the axle. The ends of the spacer plates are beveled at 11, as shown, said plates converging to the points in the middle of the leaves, as clearly shown in Figs. 2 and 3. When dust or dirt gets in the space between the leaves it passes down the inclined face of the spring leaves and the beveled faces 11 of the spacer plates cause it to become discharged from between the leaves thereby insuring free spaces between the leaves and the freedom of the dirt between them. The connecting leaf 1 is provided with loops 1a by means of which it is connected to the body of the vehicle. By means of this construction I can secure greater strength and elasticity with a smaller number of spring leaves than is the case where the leaves make contact through their length as in the ordinary springs. This construction also prevents the necessity of oiling the spring and also prevents the accumulation of dirt and reduces the number of spring leaves for any given condition. The pressure bar 3 at the top acts as a shock absorber and prevents the necessity of an extra shock absorber. If for any reason it is desired to oil the spring this can be easily done by placing a cover over the spring and the oil will then be kept in the spaces between the several leaves. I have illustrated in the drawing a spring wherein the leaves extend on opposite sides of the axle, that is a full half of a spring. It is, of course, evident that my invention may be applied to a quarter of the spring in which event only one end of the spring leaf may be bent, the spacer plates being placed between the other ends.

I claim:

1. A spring comprising a series of spring leaves having their ends bent out of alignment with relation to the body portion of the leaf and projecting in the same general direction as the leaf, the bent ends having flat engaging faces, the flat engaging face of one spring leaf engaging the faces of the associated spring leaf so as to separate said spring leaves throughout their length between the bent ends, the leaves being substantially uniform in thickness and the bent ends being integral and the same thickness as the remaining portions but out of alignment therewith.

2. An imperforate spring comprising a series of spring leaves having their ends bent out of alignment with relation to the body portion of the leaf, the bent ends of one spring leaf engaging the faces of the associated spring leaf so as to provide spaces between the adjacent spring leaves, imperforate spacer plates between the spring leaves at the center of the spring, said plates having beveled edges at each end thereof.

3. An imperforate spring comprising a series of spring leaves having their ends bent with relation to the body portion of the leaf, the bent ends of one spring leaf engaging the faces of the associated spring leaf so as to provide open spaces between the adjacent spring leaves, imperforate spacer plates between the spring leaves at the center of the spring, fastening devices for fastening the leaves to the vehicle, means associated with said spacer plates for preventing longitudinal movement thereof with relation to said fastening devices comprising notches into which said fastening devices are received.

4. A spring comprising a series of spring leaves having their ends bent with relation to the body portion of the leaf, the bent ends of one spring leaf engaging the faces of the associated spring leaf so as to provide spaces between the adjacent spring leaves, spacer plates between the spring leaves at the center of the spring, said spacer plates having beveled edges which converge toward the center line thereof.

5. A spring comprising a series of spring leaves having their ends bent with relation to the body portion of the leaf, the bent ends of one spring leaf engaging the faces of the associated spring leaf so as to provide spaces between the adjacent spring leaves, dirt discharging members between said leaves for causing dirt which gets between the spring leaves to be discharged therefrom.

6. A spring comprising a connecting leaf and a series of spring leaves, a pressure bar on top of said connecting leaf substantially parallel with said leaves and having its ends bent to engage the connecting leaf the portion of the pressure bar intermediate its bent ends being out of contact with said connecting leaf.

7. A spring comprising a connecting leaf and a series of spring leaves, a pressure bar on top of said connecting leaf having its ends bent to engage the connecting leaf whereby a space is provided between the connecting leaf and the pressure bar, the said spring leaves having their ends bent with relation to the body portion thereof so as to provide spaces between them and bands enclosing the ends of the pressure bar, the connecting leaf and a plurality of said spring leaves, said bands engaging the bent ends of said pressure bar.

8. A spring comprising a series of spring leaves, one end bent with relation to the body portion of the leaf, the bent end of one leaf engaging the face of the adjacent leaf so as to provide a space between the two adjacent leaves, and spacer plates between the spring leaves at a distance from the bent ends thereof, said spacer plates having their edges shaped to act as dirt discharge devices.

9. A spring comprising a series of spring leaves, connecting devices for connecting said leaves together, and means operating continuously while the spring is in use for discharging foreign material from between said leaves.

10. A spring comprising a connecting leaf and a series of spring leaves connected together and a pressure bar on top of said connecting leaf having its ends bent to engage the connecting leaf the central portion of said pressure bar being out of contact with said connecting leaf.

Signed at Chicago, county of Cook, and State of Illinois, this 11th day of December, 1924.

OSCAR LINUS NEISLER.